W. SYLVESTER.
COOKING VESSEL.
APPLICATION FILED MAR. 29, 1909.

959,647.

Patented May 31, 1910.

witnesses:

inventor

UNITED STATES PATENT OFFICE.

WILLIAM SYLVESTER, OF PITTSBURG, PENNSYLVANIA, ASSIGNOR TO FOUR UTENSIL MANUFACTURING COMPANY, OF PITTSBURG, PENNSYLVANIA, A CORPORATION OF PENNSYLVANIA.

COOKING VESSEL.

959,647.  Specification of Letters Patent.  Patented May 31, 1910.

Application filed March 29, 1909. Serial No. 486,318.

*To all whom it may concern:*

Be it known that I, WILLIAM SYLVESTER, a resident of Pittsburg, in the county of Allegheny and State of Pennsylvania, have invented certain new and useful Improvements in Cooking Vessels, of which the following is a specification.

The object of this invention is to provide improved means for holding the cover in position on a sauce-pan or other cooking vessel when it is tilted to pour off water or other liquid, the cover thus held preventing the solids, as meat, vegetables, etc. from discharging. Heretofore various devices and constructions have been proposed for this purpose, and the present invention is designed as an improvement thereon, both in mode of operation and economy in construction.

Figure 1:
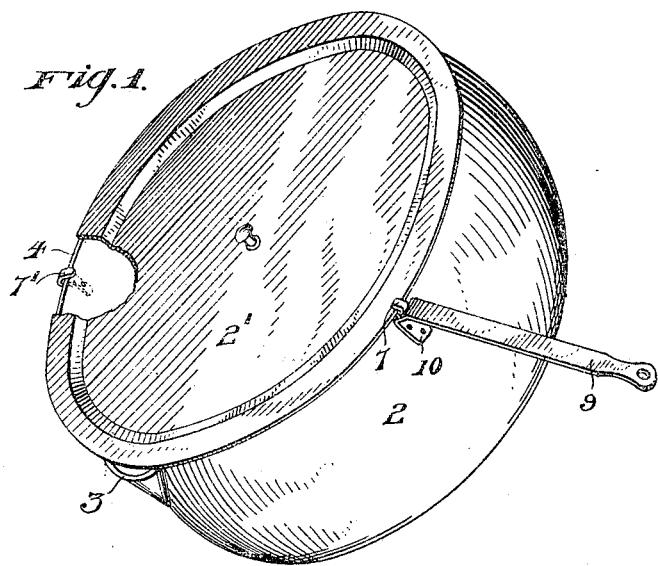
Figure 2:
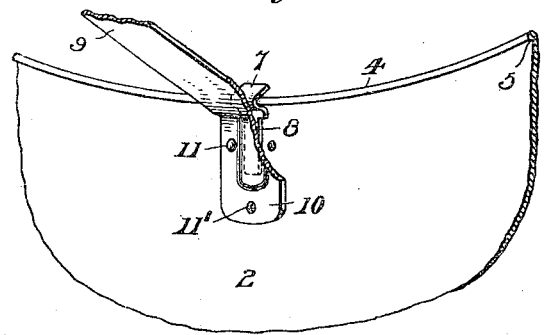
Figure 4:
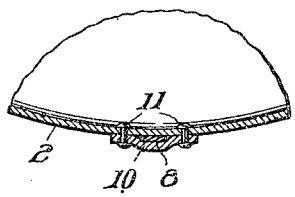
Figure 3:
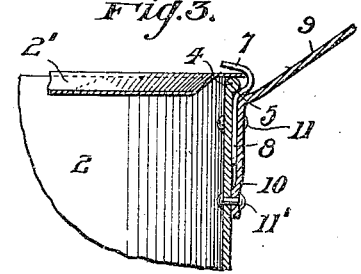
Figure 5:
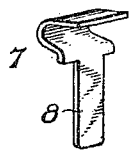

In the accompanying drawings, Figure 1 is a view in perspective of a cooking vessel equipped with the improvement, the same being shown tilted as when pouring liquid therefrom. Fig. 2 shows a portion of the vessel on a larger scale. Fig. 3 is a vertical sectional view through the base of the handle taken in the plane of rivet 11', and Fig. 4 is a cross-section of the same in the plane of rivets 11. Fig. 5 is a detail of one of the lugs.

Referring to the drawings, 2 designates the body of a cooking vessel, here shown in the form of a sauce-pan, provided with the usual pouring lip 3. At the top edge is the usual rounded bead 4 forming the external annular shoulder 5.

2' is the loose cover of familiar design, and 7, 7' are two hook-like lugs or projections secured to the vessel and overhanging bead 4, with the cover slipped thereunder, the hooks or lugs being so positioned as to hold the cover in place when the vessel is inclined, as when pouring water from potatoes, etc.

The invention resides in the form or construction of hooks or lugs 7, 7'; also in the mode of securing them, particularly lug 7, to the vessel. These hook-like lugs are preferably, though not necessarily, of like design thereby economizing the cost by forming them by one and the same die. Each of the lugs consists of the hook-like overhanging upper portion, the curvature of each of which is such as to extend beneath shoulder 5 of bead 4, and a depending shank portion 8. The shank of lug 7' is riveted to body 2 in the ordinary manner, said lug being located on the opposite side of lip 3 from lug 7. Lug 7 is secured by the same means which secures the handle.

In the present adaptation, the handle 9 is of familiar construction, having its inner end turned downward at 10 and riveted to the vessel immediately below bead 4. Three rivets are preferably employed, the two upper rivets 11 being adjacent the edges of part 10, with a central rivet 11' securing the lower extremity thereof. Lug 7 overhangs bead 4 at the base of the handle, as shown, with its shank 8 projected beneath the bead and securely held between body 2 and handle-part 10 by rivets 11, one on either side. The parts may be conveniently assembled by first inserting rivet 11', then slipping lug 7 into place, and then drawing the handle into its permanent and fixed position on the body by rivets 11. Thus, no special riveting is required, the rivets necessary for the handle serving to clamp it in place. Bead 4, beneath which the shank of the lug extends, prevents upward displacement. With lug 7 thus located it is protected by the handle and there is less liability of it being broken or bent out of shape. The lugs so hold the cover that the latter is retained in position when the vessel is tilted for pouring off its liquid contents, retaining the solids within the vessel.

I claim:—

1. The combination of a cooking vessel, a cover therefor, a handle having a downturned portion secured to the vessel, and a cover-holding lug having a depending portion confined between the body of the vessel and the depending portion of the handle.

2. The combination of a cooking vessel having a bead at its top edge forming an external shoulder, a cover, a handle having a depending portion secured to the vessel beneath the bead, and a cover-holding lug embracing the bead and having a portion confined between the depending part of the handle and the vessel, said lug held by the shoulder of the bead against upward displacement.

In testimony whereof I affix my signature in presence of two witnesses.

WILLIAM SYLVESTER.

Witnesses:
 J. M. NESBIT,
 JNO. J. FITZGERALD.